United States Patent Office

Re. 26,815
Reissued Mar. 10, 1970

26,815

EXPLOSIVE COMPOSITION AND METHOD

Charles H. Grant and Thomas E. Slykhouse, Midland, Mich., assignors to The Dow Chemical Company, Midland, Mich., a corporation of Delaware No Drawing. Original No. 3,377,909, dated Apr. 16, 1968, Ser. No. 671,556, Sept. 29, 1967. Application for reissue Nov. 29, 1968, Ser. No. 793,204
Int. Cl. C06d *1/08*
U.S. Cl. 86—20 10 Claims

Matter enclosed in heavy brackets [ ] appears in the original patent but forms no part of this reissue specification; matter printed in italics indicates the additions made by reissue.

ABSTRACT OF THE DISCLOSURE

A two component explosive composition system containing two distinct masses comprising (1) an inorganic oxidizing salt mass contiguous to (2) an over-fueled explosive mass, i.e., one having a paucity of oxygen as compared to the oxidizable fuel it contains, and more particularly pertains to a two component explosive system comprising an inorganic oxidizing salt mass adjacent to or surrounding a mass comprising a mixture of an excess of inorganic fuel and an inorganic oxidizing salt, and to methods for preparing the explosive and loading boreholes therewith.

CROSS-REFERENCE

This application is a continuation-in-part of application Ser. No. 468,987, filed July 1, 1965, and now abandoned.

BACKGROUND

Ammonium nitrate, alkali metal nitrates and alkaline earth nitrates, with or without petrolic liquids, can be used in explosive compositions. In recent years a mixture of about 94 percent by weight of ammonium nitrate with about 6 percent petroleum oil has been widely used commercially as a mining and excavating explosive. Inorganic chlorates and perchlorates have explosive properties, but they have not been widely accepted because of their sensitivity to detonation and cost. Both the chlorate, perchlorate and ammonium nitrate-fuel oil explosives have the shortcoming of behaving very erratically in boreholes containing water and in their shortage of power or total work in dry holes.

A more recent development in the field of explosives is the use of slurries of particulate ammonium nitrate and an organic or inorganic fuel, or both, in a saturated solution of ammonium nitrate. These solutions can be aqueous or non-aqueous, such as ammonia solutions of ammonium nitrate, or solutions of the latter in water or aqueous ammonia. The sensitizers can be particulate light metals such as aluminum, alloys containing 80 percent or more aluminum, magnesium, alloys of magnesium containing 60 percent or more Mg, boron, vanadium, chromium, thorium, tungsten and mixtures of aluminum and ferro-silicon. Other sensitizers include carbon or known water insoluble, solid nitro-organic explosives such as trinitrotoluene, cellulose nitrate, pentaerythritol tetranitrate, tetryl, RDX, composition B and pentolite. These slurries all have the advantage over ammonium nitrate-fuel oil mixtures in that they are not seriously affected by the presence of water in boreholes. Metallized slurries have the added advantage that they produce a considerably greater amount of total power as compared to the non-metallized slurries, if the amount of metal and the oxidizing agent are used in amounts not greater than stoichiometric. If however, more than stoichiometric amounts of metal are used in an explosive composition, the added metal does not tend to generate proportionately more power, because there is not sufficient oxygen to combine with the metal in an area that will contribute to useful explosive power.

SUMMARY

It appears that if a mass consisting of an inorganic oxidizing salt is placed contiguous to a mass consisting of an over-fueled explosive, the total work power obtained on detonation is greater than that from a fueled explosive having an equivalent amount of fuel distributed uniformly throughout the entire mixture. An object of the invention is provision of a two component explosive system having two distinct masses and comprising (1) an inorganic oxidizing salt mass contiguous to (2) a mass consisting of a mixture of an oxidizing salt and more than a stoichiometric amount of an oxidizable fuel.

Another object is the provision of an explosive system comprising a first mass consisting of an ammonium, alkali metal or alkaline earth metal nitrate, chlorate or perchlorate, with or without petrolic liquid, contiguous to a second mass consisting of a slurry containing an inorganic oxidizing salt and an amount of inorgaic fuel greater than that stoichiometrically required for complete oxidation by the oxidizing ingredient in the slurry.

Another object is the provision of an explosive system comprising a first mass consisting of an inorganic oxidizing salt, which can be an ammonium alkali metal or alkaline earth metal chlorate,, perchlorate or nitrate, with or without a petroleum fuel oil, contiguous to a second mass consisting of a slurry of said chlorate, perchlorate or nitrate in particulate form and an inorganic oxidizable substance which can be carbon, aluminum, aluminum alloys containing at least 80 percent by weight of aluminum, magnesium, magnesium alloys containing at least 60 percent magnesium, alloys of aluminum and magnesium, vanadium, chromium, thorium, tungsten, boron and mixtures of said metals with or without carbon, and mixtures of aluminum and ferro-silicon in a saturated solution of said chlorate, perchlorate or nitrate.

Still another object is the provision of a two component explosive system comprising a first mass consisting of a mixture of about 94 weight percent ammonium nitrate and 6 percent fuel oil contiguous to a second mass consisting of an aqueous slurry of a particulate ammonium nitrate, sodium nitrate or a mixture of ammonium nitrate and sodium nitrate and aluminum in suspension in a saturated solution of ammonium nitrate or a mixture of ammonium and sodium nitrate wherein the amount of aluminum in said slurry is at least 25 percent by weight of the slurry.

Another object is the provision of a method for preparing the explosive system comprising the oxidizing agent mass contiguous to the slurried mixture of oxidizing agent and excess fuel.

The term "contiguous to" as used in the description of this invention and in the claims is intended to mean that component (2) is adjacent to, abutting, surrounded by a substantial quantity, in stratified contact with, or spaced a slight distance from component (1).

PREFERRED EMBODIMENT

The above objects are attained by either stratifying (1) an inorganic oxidizing salt mass with (2) a second mass consisting of an explosive containing more than the stoichiometric amount of fuel based on its oxidizing ingredient or by spacing the over-fueled component (2), so that the oxidizing agent (1) surrounds the over-fueled component. The over-fueled component can range from about .4 to about 36 percent by weight of the total explosive load (1) and (2), depending on the amount of oxidizable material in component (2). With increased amounts of oxidizable material, the lower ranges in the percentage scale can be used, or preferably, if aluminum powder is one of the ingredients of an over-fueled component, the latter is used in an amount to provide 0.75 to 18 percent by weight of aluminum based on the total weight of component (1) and (2). More preferably, the aluminum content ranges from about 0.9 to about 8 percent by weight of (1) and (2), and most preferably from about 0.9 to about 5 percent Al.

In effect, the final explosive is a two component explosive system containing a first mass, component (1), the oxidizing salts contiguous to a second mass, component (2), an overfueled mixture of oxidizable materials and oxidizing agents enumerated below.

Component (1) of the system can be one or a combination of the following in any proportion: ammonium nitrate, sodium nitrate, potassium nitrate, caesium nitrate, lithium nitrate, rubidium nitrate, any alkaline earth nitrate, ammonium chlorate, alkali metal chlorates, alkaline earth chlorates, ammonium perchlorate, alkali metal perchlorates and alkaline earth metal perchlorates, and ammonium salts or complexes of the above compounds.

The component (1) must be in particulate form. The average particle size can range from about 5 microns to about 5 U.S. Tyler Mesh sieve size.

Other ingredients which can be added to component (1) are petrolic liquids such as crude oil and liquid hydrocarbons derived or fractioned therefrom and kerosene, diesel fuel, petroleum distillate and unrefined petroleum. The amount of petrolic liquid can range from 0 to 10 percent by weight of component (1).

If a petrolic liquid is used, the oxidizing salt hydrocarbon mixture of component (1) can be gelled if desired. This can be accomplished by blending a small amount of a natural gum or a high molecular weight addition polymer of an $\alpha$-$\beta$ monoolefinically unsaturated carboxylic or sulfonic acid, such as acrylic acid and styrene sulfonic acid, or an amide such as acrylamide, or a copolymer maleic anhydride and another monomer copolymerizable therewith, and a small amount of aqueous ammonia or a monovalent alkali to dissolve or swell the polymer to a gel state, with the oxidizing agent or oxidizing agent plus the hydrocarbon. The gel can thus be aqueous or non-aqueous.

Component (2) of the explosive system can be a mixture of any of the oxidizing salts mentioned in (1) above, together with an amount of oxidizable material greater than that calculated as being oxidizable by the oxygen available in the oxidizing agent.

The oxidizable material in component (2) can be finely divided carbon, or a particulate metal or metalloid such as aluminum, alloys thereof containing at least 80 percent aluminum, magnesium, alloys of magnesium containing at least 60 percent Mg, such as the ASTM designated ZK10, ZK60, HK31 and AZ31 alloys, boron, vanadium, chromium, thorium, tungsten, mixtures of these oxidizable ingredients and mixtures of aluminum and ferrosilicon.

The amount of oxidizable material in component (2) can range from 25 to 80 percent by weight of this component. When Al or Mg is used as the oxidizable material, the preferred range is from 30 to 70 percent by weight of the final mixture.

The amount of oxidizing agent can range from 20–75 percent by weight of the final mixture, but it should be less than that calculated to oxidize the oxidizable ingredient to its highest state of oxidation and will vary somewhat depending on the amount of optional ingredients in the mixture.

Optional ingredients in component (2) are 0–25 percent by weight of water, 0–33 percent by weight of formamide and 0–6 percent of a water-swellable polymeric substance, either as a natural gum or a synthetic polymer.

Thus, component (2) can be a dry mix or it can be a slurry of oxidizable material and oxidizing agent or a gel of the latter ingredients.

It can also be an aqueous or a non-aqueous slurry. Thus, if ammonium nitrate or a mixture of ammonium nitrate and an alkali metal nitrate, such as $NaNO_3$, is used as the oxidizing agent, the nitrates can be dissolved in a minimum of water, or $NH_3$ or aqueous ammonia. The ammonia nitrate solutions with little or no water are represented by a composition sold as Spensol D and by Divers fluid, respectively. When a slurry is formed, it is desirable, but not essential, to have some of the oxidizing agent together with the oxidizable substance suspended in a saturated solution of the oxidizing agent.

Of the component (1), a composition of 94 percent by weight of fertilizer grade ammonium nitrate and about 6 percent fuel oil is preferred. This is sometimes referred to herein as ANFO.

For component (2), the preferred compositions have the following ranges or percentages by weight:

| | Percent |
|---|---|
| Water | 10–15 |
| Formamide | 5–10 |
| Sodium nitrate [1] | 10–25 |
| Ammonium nitrate [1] | 10–50 |
| Aluminum | 25–50 |
| Gum | 0–1 |

[1] Total nitrate, 35–60%.

The particle size of the aluminum can range from −325 Tyler Mesh to about 20 mesh. The preferred particle size of the aluminum is that which passes a 40 mesh Tyler sieve and is about 99 percent retained on a 200 mesh sieve.

If desired, component (2) can contain from about 5 to about 25 percent, based on the weight of the other ingredients, of a nitro-organic sensitizer. This nitro-organic ingredient can be present in either a dry mix or in a paste or slurry.

There are several ways of loading a borehole with the two component explosive system.

In one system, alternate decks of explosive and stemming can be used. The over-fueled explosive, component (2), is placed in one or more of the lower decks [,] and is then covered with an oxidizing ingredient, component (1), such as a mixture of 94 percent ammonium nitrate and 6 percent fuel oil.

In a second system, an over-fueled explosive, component (2), in plastic bags is spaced in alternating layers with *an* ammonium nitrate-fuel oil mixture, component [(2)] *(1)*.

In a third system, a metallized slurry, of which a slurry of 10–15 percent water, 8–10 percent formamide, 25 percent or more particulate aluminum of 40–100 mesh and the remainder ammonium nitrate or a mixture of ammonium nitrate and sodium nitrate is a representative, is placed at a predetermined position along the length of a borehole *and* in the bottom of a borehole as component (2) and then the hole is filled with *an* ammonium nitrate (94 percent)[,] fuel oil mixture (6 percent), component (1), in which bags of the slurry above described are suspended or positioned. The slurry in the system can be one in which a saturated solution of ammonium nitrate contains suspended therein some particulate ammonium nitrate and a solid nitro-organic explosive, such as TNT, cellulose nitrate or other well-known nitro-organic compounds which can be detonated with high pressure boosters.

There are many other variations of arranging the two components of this explosive system. It is essential only that one of the components be over-fueled with respect to the oxidizing salt and the other be an oxidizing salt as described under (1) above and that the latter be contiguous to this over-fueled mix.

For detonating the explosive, a high pressure booster armed with an electric blasting cap can be employed, Preferably, the cap should be a No. 8 or larger and more desirably it is an Engineer Special Blasting Cap equivalent to about a No. 10 electric blasting cap. The booster can be RDX, Pentolite, pressed tetryl, shaped charges such as GG2 or GG4, or other well-known high detonation pressure boosters. The amount of booster needed will depend in part on the type used and in part on the size of the load in the borehole. The electric cap is connected to a wire, which in turn is connected to a controllable source of electric current, which can be fed through the wires to the cap at the desired time.

The following examples are intended to be illustrative and not limitations of the invention. The proportions are given in parts or percentages by weight unless otherwise indicated.

Example I

In this test in a coal field being strip mined, 20 holes averaging about 48 feet deep and 12¼ inches in diameter were back filled with about 4 feet of dirt. The holes were drilled in three rows of 6, 7 and 7 each and were spaced 37 feet in a single row (spacing) and 33 feet between rows (burden). Into each hole 120 pounds of 94 percent $NH_4NO_3$-6 percent fuel oil were added. Then 25 lbs. of an over-fueled mixture, containing about 10 percent formamide, about 12 percent water, 30 percent aluminum powder of 40–100 mesh, 1 percent karaya gum, 10 percent sodium nitrate and the remainder ammonium nitrate, was placed in the hole and armed with a 1 lb. HDP–1 primer (a pressed mixture of 20–30 percent by weight TNT and 70–80 percent RDX) connected to Primacord, 120 lbs. of 94 percent $NH_4NO_6$-6 percent fuel oil poured over the top of the aluminized slurry. Three hundred sixty pounds of $NH_4NO_3$-fuel oil mixture defined above, in bags, were placed on top of the slurry. Then 25 additional pounds of the aluminized slurry, described above, also armed with a 1 lb. HDP-1 primer connected to Primacord was added and over this was poured 120 lbs. of the 94 percent $NH_4NO_3$-6 percent oil mixture. Loading was completed with 120 lbs. of 94 percent $NH_4NO_3$-6 percent fuel oil mixture contained in bags and then covered with 26 feet of stemming.

The holes were detonated in series of 4 holes in each of the first two shots; three holes in each of the next four shots.

The results of these shots were excellent. The burden covering the coal was broken well for relatively easy mechanical handling and the entire bank of covering was moved from the coal vein, so that no secondary blasting was needed. The powder factor was calculated to be 2.432 cu. yds. per lb. of explosive.

In commercial practice in this mine, using only 94 percent $NH_4NO_3$-6 percent fuel oil as the explosive, in comparable sized holes, fired in comparable sequences, a maximum hole spacing was 30 x 34 ft. The estimated powder factor was 2007 cu. yds. per lb. of powder.

In a second series of tests in the same coal field, using a single continuous deck of explosives having an over-fueled explosive interposed between an oxidizing agent, 21 holes approximately 45 feet deep and 12¼ inches in diameter were drilled in three rows, 7 to a row, with a spacing of 40 feet between holes in a single row and 34 feet between rows. The bottom of each hole was back filled about 4 ft. In the bottom of each hole were placed 120 lbs. of ANFO (94 percent ammonium nitrate-6 percent fuel oil), then 25 lbs. of the aluminized ammonium nitrate slurry described above, and 120 lbs. of loose ANFO were packed around the aluminized slurry. An additional 340 lbs. of ANFO added were in bags, another 25 lbs. of aluminized slurry, covered by 120 lbs. of loose ANFO and 120 lbs. of ANFO in bags on the top of the explosive column. Each 25 lbs. of aluminized slurry was armed with a 1 lb. HDP–1 booster which was connected to 70 ft. of Primacord. The charges were detonated through electrical means. The amount of overburden blasted from the top of the coal vein averaged about 2256.6 cubic yds. per hole. This represents a powder factor of about 2.582 cu. yds. per lb. of explosive.

Tabulated below are the pertinent data on the charge size in each hole.

TABLE I

| Hole No. | Depth in ft. | Stem in ft. | ANFO, lbs. | Aluminized Slurry, lbs. |
|---|---|---|---|---|
| 1 | 43 | 23 | 780 | 50 |
| 2 | 45 | 24 | 840 | 50 |
| 3 | 46 | 24.5 | 840 | 50 |
| 4 | 46 | 24.5 | 840 | 50 |
| 5 | 46 | 24.5 | 840 | 50 |
| 6 | 45 | 24 | 840 | 50 |
| 7 | 45 | 23.5 | 840 | 50 |
| 8 | 44 | 22.5 | 780 | 50 |
| 9 | 42.5 | 23 | 720 | 50 |
| 10 | 43 | 24.5 | 780 | 50 |
| 11 | 46 | 24 | 840 | 50 |
| 12 | 45 | 23.75 | 840 | 50 |
| 13 | 44.5 | 23.75 | 840 | 50 |
| 14 | 44.5 | 24 | 840 | 50 |
| 15 | 46 | 24 | 840 | 50 |
| 16 | 45 | 24.5 | 840 | 50 |
| 17 | 46 | 24.5 | 840 | 50 |
| 18 | 46 | 24.5 | 840 | 50 |
| 19 | 42 | 22 | 720 | 50 |
| 20 | 45 | 24 | 840 | 50 |
| 21 | 45 | 24 | 840 | 50 |

In each of the holes of this example, there was only one continuous column of explosive containing an over-fueled slurry of aluminum and ammonium nitrate suspended in a saturated ammonium nitrate solution stratified between ammonium nitrate fuel oil mixture at various levels in the explosive column.

The data show that a fairly wide variation in proportions of aluminized slurry to ANFO can be employed in the practice of this invention.

Example II

In this series of tests, two rows of holes, each row containing nine holes varying in depth from 55 to 63 feet, and having a diameter of 10⅝ inches and a spacing of 26 x 30 feet were filled with 2 and 3 deck charges of explosive. To the six front holes farthest to the right and three holes farthest to the right in the back row were added 50 lbs. of slurry of 10 percent formamide, 12 percent water, 30 percent aluminum powder 40–100 mesh, 1 percent gum, 10 percent $NaNO_3$ and the remainder $NH_4NO_3$, and 300 lbs. of 94 percent $NH_4NO_3$-6 percent fuel oil, which surrounded the aluminized slurry. Two 1 lb. pentolite boosters were placed in the slurry. The boosters were connected with Primacord to an electrical detonating unit. Over this deck was placed 15 ft. of stemming. Then 200 lbs. of ANFO charged with 1 lb. of pentolite was placed in the hole and 20 ft. of stemming added.

To the remaining holes were added 25 lbs. of the aluminized slurry described above and 300 lbs. of ANFO armed with a 1 lb. pentolite booster. This deck was covered with 10 ft. of stemming. The next deck contained 150 lbs. ANFO, 25 lbs. of the aluminized slurry and 1 lb. of pentolite. This intermediate deck was covered with 10 ft. of stemming. The upper deck consisted of 100 lbs. ANFO charged with 1 lb. of pentolite. Over this upper deck were 24 ft. of stemming. All pentolite boosters were connected to Primacord.

On detonating these holes, the overburden was blasted into the pit in a size which was amenable to mechanical handling. It is calculated that the average powder factor is 2.86 cu. yds. per lb. of explosive.

The normal spacing in this mine with 94 percent $NH_4NO_3$-6 percent fuel oil, using the same size boreholes, the same weight of ANFO as in the experimental shots, the same types of booster, and the same type of loading procedure, was 22.5 x 26 ft. The calculated powder factor is 2.34 cu. yds. per lb. of explosive.

Example III

In these tests, two rows of 10⅝ inches diameter holes having depths ranging from 57.5 to 61 ft. were drilled in overburden covering a coal vein. The front row had seven and the back row had 8 holes in staggered relation, with a spacing of 30 ft. for each hole in a single row and 26 ft. between rows, as shown by the following pattern:

1 2 3 6 10 11 12 13
4 5 7 8 9 14 15

Pertinent data on these holes are tabulated below:

TABLE II

| Hole No. | Depth, ft. | ANFO, lbs. | Pentolite, lbs. | Primacord, ft. | Slurry lbs. |
|---|---|---|---|---|---|
| 1 | 57.5 | 630 | 4 | | 50 |
| 2 | 57.5 | 600 | 4 | 60 | 50 |
| 3 | 58.5 | 600 | 4 | 60 | 50 |
| 4 | 57.5 | 630 | 4 | 60 | 50 |
| 5 | 58 | 630 | 4 | 60 | 50 |
| 6 | 59 | 600 | 3 | 60 | 25 |
| 7 | 58 | 650 | 3 | 60 | 25 |
| 8 | 58 | 650 | 3 | 60 | 25 |
| 9 | 60 | 650 | 3 | 60 | 25 |
| 10 | 59.5 | 600 | 3 | 60 | 25 |
| 11 | 60.5 | 600 | 3 | 60 | 25 |
| 12 | 60.5 | 600 | 3 | 60 | 25 |
| 13 | 61 | 600 | 3 | 60 | 25 |
| 14 | 61 | 650 | 3 | 60 | 25 |
| 15 | 61 | 650 | 3 | 60 | 25 |

Holes 1, 4 and 5 each were charged with 300 lbs. ANFO, 25 lbs. of a slurry of 10 percent formamide, 12 percent water, 10 percent sodium nitrate, 30 percent aluminum of 40–100 Tyler Mesh, 1 percent natural gum and the remainder ammonium nitrate, and a 1 lb. pentolite booster. Ten feet of stemming were placed on this portion of the explosive. The second deck contained 200 lbs. of ANFO, 25 lbs. of the metallized ammonium nitrate slurry described above and 2 lbs. of pentolite. Ten feet of stemming were placed over this deck. The top deck contained 130 lbs. of ANFO and a 1 lb. pentolite booster. Twenty-three feet of stemming were placed on this deck.

The charge in holes 2 and 3 differed only in that the top deck contained only 100 lbs. of ANFO.

The charge in holes 6, 10, 11, 12 and 13 consisted of 350 lbs. of ANFO, 25 pounds of the aluminized ammonium nitrate slurry described above and a 1 lb. pentolite booster. Fifteen feet of stemming were placed over this deck. The second deck contained 150 lbs. ANFO and a 1 lb. pentolite booster. This was covered with eight feet of stemming. The top deck contained 100 lbs. ANFO and a 1 lb. pentolite booster.

The charges in holes 7, 8, 9, 14 and 15 differed from those immediately above only in that the second deck contained 200 lbs. ANFO and seven feet of stemming between the second and top decks.

Each hole was armed with an Engineers Blasting Cap connected to a 1 lb. pentolite booster by Primacord. Detonation was effected serially through remote control electrical means.

Holes 1–5 were shot first. This filled the pit and there was some indication that it was too powerful for the conditions at this mine.

The remaining holes were blasted in the following order:

| Blast No.: | Holes blasted |
|---|---|
| 2 | 6 |
| 3 | 7, 8 |
| 4 | 9, 10 |
| 5 | 11 |
| 6 | 12 |
| 7 | 13 |
| 8 | 14, 15 |

The calculated powder factor was 2.86 cu. yds. per lb. of explosive.

The overburden was well broken from the coal vein and was fractured to a size readily movable by mechanical equipment at the mine.

The normal spacing using ANFO and a booster only at this mine is 22.5 x 26 ft.

Example IV

For purposes of brevity, only the charge spacing in a single hole is described in this multi-deck example. The hole charged was 71 ft. deep and 15 inches in diameter. The bottom deck was loaded in the order specified with 200 lbs. ANFO, 25 lbs. of the aluminum containing slurry described in the previous example, a 1 lb. pentolite booster and an additional 300 lbs. of ANFO. Stemming was added up to the 56 ft. level. The second deck contained 200 lbs. ANFO, 25 lbs. of the aluminum containing slurry, a 1 lb. pentolite booster and an additional 200 lbs. of ANFO. Stemming filled the holes to the 44 foot level. The third deck contained 200 lbs. ANFO with a centrally placed 1 lb. pentolite booster. The hole was stemmed to the 36 ft. level. The fourth deck contained 150 lbs. of ANFO and a 1 lb. pentolite booster. Stemming was added to the 25 ft. level. The top deck contained 100 lbs. of ANFO with a centrally located 1 lb. pentolite booster. Stemming filled the rest of this hole. All pentolite boosters were connected to Primacord.

Spacing of holes was 36 x 45 feet.

On detonation, the average amount of over-burden removed from the coal vein was 4260 cu. ft. per hole. By comparison, the normal practice at the mine, using primed ANFO only, was to use a spacing of 27 x 30 ft. which dislodged an average of about 3195 cu. yds. of overburden per hole.

The explosives and the method of their preparation and loading into boreholes can be used in any type of blasting operation, including metal ore mining, limestone quarrying, sand pits, excavation operations for construction of buildings or dams, building stone quarrying, surface pond formations and for underground mining The use of other over-fueled components defined under (2) above can be used to replace the aluminum, sodium nitrate and ammonium nitrate slurries of these examples. The results obtained from the various specific compositions of component (2) will depend largely on the amount of energy released and the rate of its release in the oxidation of the oxidizable substance of component (2) by the oxidizing agent of component (1).

Other oxidizing ingredients defined under (1) above can be used in place of the mixture of sodium nitrate and ammonium nitrate of the specific examples to obtain comparable results.

As is evident from the description of the invention, the method of preparing the two component explosive composition comprises placing the inorganic oxidizing ingredient defined in (1) contiguous to an over-fueled mixture defined in (2) above. The proportions of (1) and (2) can vary over a wide range, and should contain sufficient (2) to provide at least .75 percent by weight of fuel, namely as carbon, or any of the metals or alloys mentioned above and not more fuel than is sufficient to provide a stoichiometric quantity thereof as calculated from the total amount of oxidizing agent available in components (1) and (2).

The method of loading boreholes comprises placing the oxidizing ingredient defined in (1) contiguous to the over-fueled mixture defined in (2) one or more decks in the boreholes and arming the explosive with one or more high velocity boosters. For most favorable results, the over-fueled portion of the explosive should be near the bottom of the borehole, or near the area requiring the greatest power for dislodging rock or ore from a face. The ratio of (1) to (2) in any one deck or in any borehole can range from about 2 to 1 to about 20:1, depending in part on the fuel in component (2) and in part on the type of structures being blasted.

What is claimed is:

1. A method of loading a borehole with a two component explosive system containing at least two distinct masses which comprises:

(a) placing into a borehole a component (1) comprising an inorganic oxidizing salt mass contiguous to a component (2) comprising an over-fueled explosive composition mass containing at least one inorganic oxidizing salt and a particulate metal, said metal being present in *component (2) in* an amount in excess of that stoichiometrically required for complete oxidation by said salt of said component (2) upon detonation, and *said component (2) being provided in an amount to provide at least about 0.75 percent by weight of said excess metal, based on the total weight of components (1) and (2), and not more excess metal than is sufficient to provide a stoichiometric quantity of metal based on the total amount of available inorganic oxidizing salts in component (1) and component (2), and*

(b) arming the two *component* explosive system with detonation means.

2. The method of loading a borehole as defined in claim 1 wherein said component (2) is an over-fueled slurry explosive composition mass containing at least one inorganic oxidizing salt and a particulate metal, said metal being present in an amount in excess of that stoichiometrically required for complete oxidation by said salt in said component (2) upon detonation.

3. The method of loading a borehole as defined in claim 2 wherein a confined mass of component (2) is placed at the bottom of the borehole and at predetermined positions along the length of the borehole and component (1) is placed in the borehole so as to completely surround the component (2) positioned along the length of the borehole and contiguous to component (2) at the bottom of the borehole and wherein at least the confined mass of component (2) at the bottom of the borehole is armed with a high pressure booster.

4. The method of loading a borehole as defined in claim 1 wherein component (1) comprises a mixture of from about 90 to 100 percent by weight of ammonium nitrate and from about 0 to 10 percent by weight of petrolic liquid contiguous to a component (2) which comprises: a mixture containing at least one inorganic nitrate and more particulate light metal than that required to react with the nitrate contained in (2) in at least one deck in a borehole, and arming the explosive system with a high pressure booster and connecting the high pressure booster to remote control detonating means.

5. The method of loading a borehole as defined in claim 1 wherein component (1) comprises: a mixture of about 94 percent by weight of ammonium nitrate and about 6 percent by weight of fuel oil contiguous to a component (2) comprising a slurry consisting essentially of 5–10 percent by weight of formamide, 10–15 percent by weight of water, 25–50 percent by weight of aluminum having a particle size of from 40 to about 200 mesh, about .3–3 percent water-swellable gum, and the remainder a member selected from the class consisting of ammonium nitrate, sodium nitrate and mixtures thereof, the proportion of (2) being such as to provide from about .75 to about 8 percent by weight of Al, based on the combined weight of (1) and (2), the amount of explosive filling at least one half the volume of said borehole, arming the explosive with a high pressure booster and connecting said booster to remote control detonating means.

6. The method of loading a borehole as defined in claim 1 wherein component (1) comprises: a mixture of about 94 percent ammonium nitrate and about 6 percent fuel oil contiguous to a component (2) which comprises a slurry of from about 8 percent by weight formamide, about 12 percent by weight water, about 1–3 percent by weight water-swellable gum, about 30–50 percent by weight of aluminum having a particle size ranging from about 20 to about 200 Tyler Sieve Mesh, and the remainder a member selected from the class consisting of ammonium nitrate, sodium nitrate and mixtures thereof, and wherein component (1) and (2) are placed in alternative decks in the borehole and wherein the ratio of (1) to (2) ranges from about 2:1 to 20:1 and arming at least the bottom deck containing component (1) with a high pressure booster and connecting the said booster to remote control detonating means.

7. The method of loading a borehole as defined in claim 1 where the distinct masses comprising component (1) and (2) are provided in a borehole in alternating decks.

8. The method of loading a borehole as defined in claim 1 wherein component [(1)] (2) is placed at the bottom of a borehole and covered with component [(2)] (1) and wherein component [(1)] (2) is armed with a high pressure booster and connecting the booster to remote control means.

*9. A method which comprises:*

*(a) placing a component (1), comprising an inorganic oxidizing salt mass, contiguous to a component (2), comprising an explosive mass containing an inorganic oxidizing salt and a particulate metal, said explosive mass being over-fueled so that, upon detonation thereof, at least a portion of the detonation reaction compounds produced consist of incompletely oxidized fuel selected from the group consisting of said metal, oxides of said metal oxidized to less than the highest oxidation state of the metal, or mixtures thereof; providing a sufficient quantity of said explosive mass to provide from about 0.75 percent by weight of said incompletely oxidized fuel, based on the total weight of component (1) and component (2), up to that amount of incompletely oxidized fuel which can be oxidized to its highest oxidation state by the available inorganic oxidizing salts present in components (1) and (2), and*

*(b) detonating the component (2).*

*10. A method which comprises:*

*(a) placing a component (1), comprising an inorganic oxidizing salt mass, contiguous to a component (2), an explosive composition mass comprising from about 20 to about 75 percent by weight of at least one inorganic oxidizing salt and from about 25 to about 80 percent by weight of a particulate metal, wherein the weight ratio of component (1) to component (2) ranges from about 2:1 to about 20:1 and wherein a sufficient quantity of component (2) is provided to provide at least about .75 percent by weight of particulate metal, based on the total weight of component (1) and component (2), and further wherein there is provided at least a sufficient amount of available inorganic oxidizing salts in component (1) and component (2) to oxidize the particulate metal to its highest oxidation state, and*

*(b) detonating component (2).*

References Cited

The following references, cited by the Examiner, are of record in the patented file of this patent or the original patent.

UNITED STATES PATENTS

| | | | |
|---|---|---|---|
| Re. 25,685 | 11/1964 | Griffith et al. | 102—24 |
| 2,754,755 | 7/1956 | Ruth et al. | 102—24 |
| 2,892,406 | 6/1959 | Hradel et al. | 102—23 |
| 3,046,887 | 7/1962 | Brinkley et al. | 102—22 |
| 3,046,888 | 7/1962 | Gordon | 102—22 |
| 3,112,701 | 12/1963 | Grebe | 102—22 |
| 3,342,132 | 9/1967 | Partridge | 102—24 |

FOREIGN PATENTS

| | | |
|---|---|---|
| 192,824 | 11/1957 | Austria. |

VERLIN R. PENDEGRASS, Primary Examiner

U.S. Cl. X.R.

102—23; 149—2